Nov. 27, 1934.  A. LAWRENCE  1,982,256
AUTOMOBILE SIGNAL LIGHT
Filed Aug. 4, 1932  3 Sheets-Sheet 1
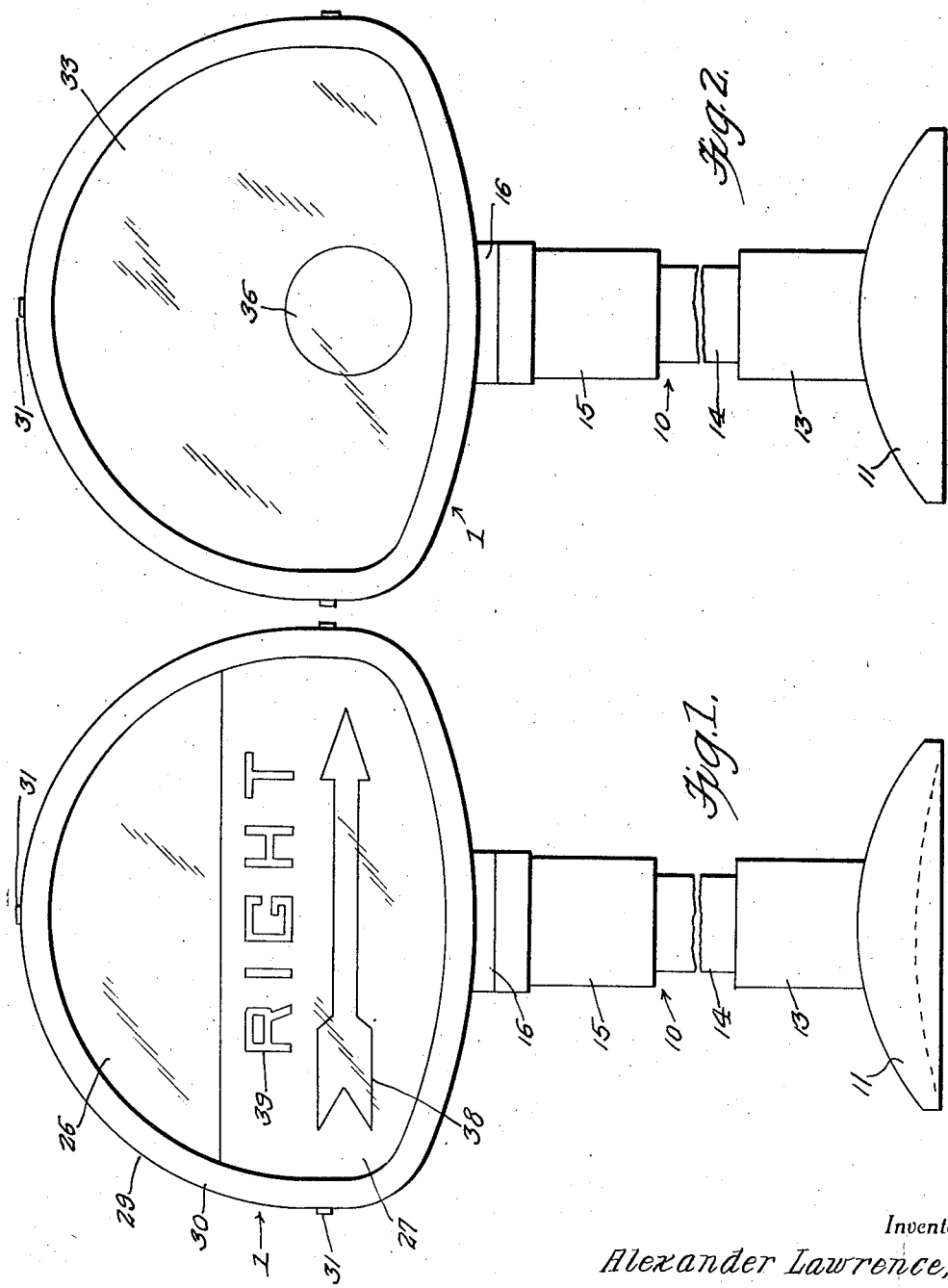
Inventor
Alexander Lawrence,
By Clarence A O'Brien
Attorney

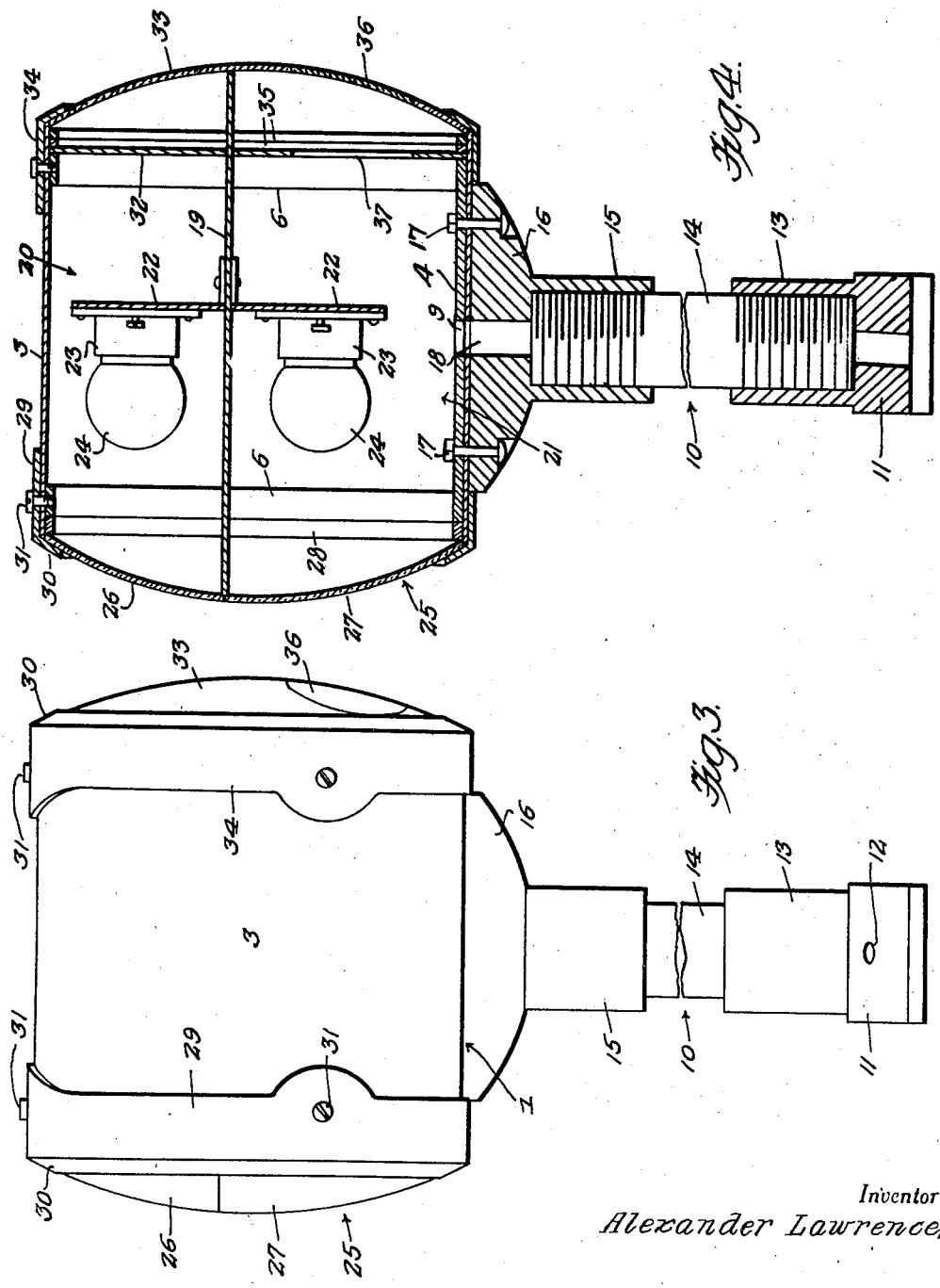

Nov. 27, 1934.  A. LAWRENCE  1,982,256
AUTOMOBILE SIGNAL LIGHT
Filed Aug. 4, 1932   3 Sheets-Sheet 3
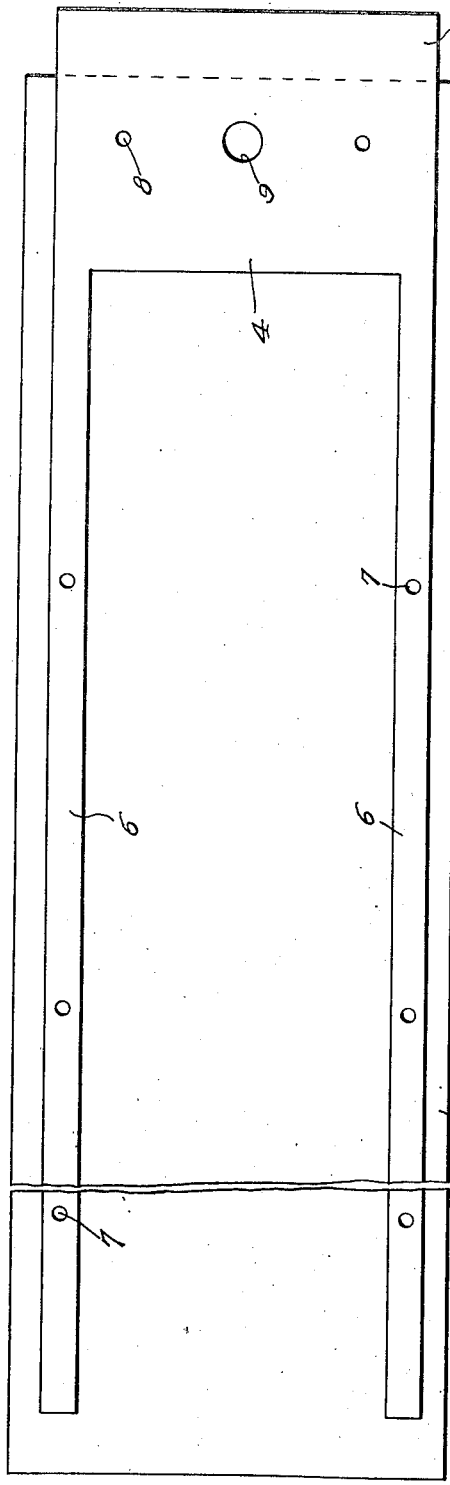
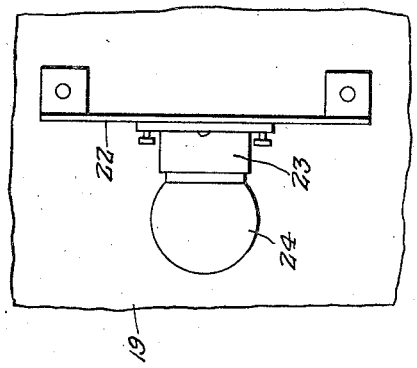
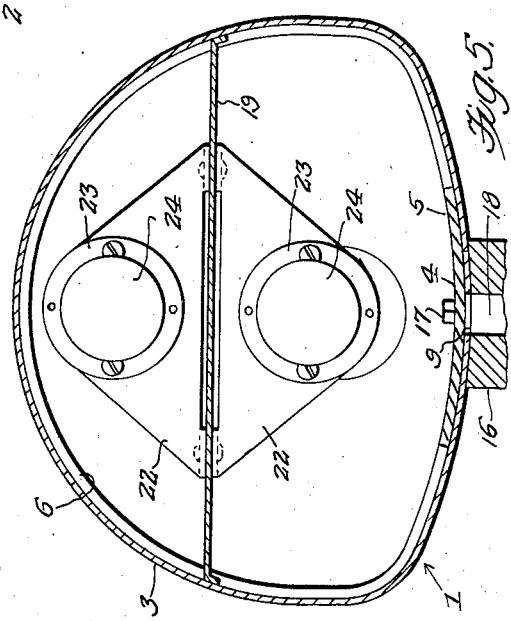
Inventor
Alexander Lawrence,
By *Clarence A. O'Brien*
Attorney Patented Nov. 27, 1934

1,982,256

UNITED STATES PATENT OFFICE 1,982,256

AUTOMOBILE SIGNAL LIGHT

Alexander Lawrence, Pawtucket, R. I.

Application August 4, 1932, Serial No. 627,489

1 Claim. (Cl. 177—329)

The present invention relates to a signal light for use particularly on automobiles and has for its primary object to provide, in a manner as hereinafter set forth, a light of this character embodying a novel construction, combination and arrangement of parts through the medium of which pedestrians and the operators of other vehicles may be warned in advance when the driver of the vehicle which is equipped with the light contemplates changing his course or stopping.

Another important object of the invention is to provide a signal light of the character described embodying a rear view mirror and further including means constituting a parking light for use when the automobile is parked.

Other objects of the invention are to provide a signal light of the character described which will be simple in construction, strong, durable, highly efficient and reliable in use, compact, attractive in appearance and which may be manufactured and installed at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in front elevation of an automobile signal light constructed in accordance with the present invention.

Figure 2 is a view in rear elevation thereof.

Figure 3 is a view in side elevation of the signal light.

Figure 4 is a view in vertical longitudinal section through the signal light.

Figure 5 is a view in vertical transverse section through the signal light.

Figure 6 is a detail view in top plan, showing the mounting of one of the electric light bulbs on the housing or casing partition.

Figure 7 is a plan view, showing the material from which the housing or casing is formed.

Referring now to the drawings in detail, it will be seen that the embodiment of the automobile signal light constituting the present invention which has been illustrated comprises a casing which is designated generally by the reference numeral 1. The casing 1 is formed from what might be termed a blank 2 which includes an elongated sheet of flat metal 3 on the inner side of which is secured, as by welding, a comparatively thick metallic plate 4 having one end portion projecting beyond the corresponding end of the sheet 3, as at 5. The plate 4 has formed integrally therewith spaced, parallel legs 6 which extend longitudinally on the sheet 3, said legs being welded to the sheet. The free ends of the legs 6 are spaced inwardly from the other end of the sheet 3. The legs 6 and the side edges of the plate 4 are spaced inwardly from the longitudinal edges of the sheet 3. Spaced openings 7 are provided in the blank 3, said openings being threaded and extending through the sheet 3 and the legs 6. The openings 7 receive screws to be presently described. Bolt receiving openings 8 extend through the plate 4 and the sheet 3 of the blank 2 and a comparatively large opening 9 is also provided in this portion of the blank 2 for the passage of conductor wires.

The blank 2 is rolled to the form illustrated to advantage in Figure 5 of the drawings, in which position the extending portion 5 of the plate 4 extends in overlapping relation to the other end portion of the sheet 3 while the free ends of the legs 6 abut the projecting edge of said plate 4. The joint may then be completed by welding the portion 5 of the plate 4 to the adjacent end portion of the sheet 3 over which said portion 5 projects.

The casing 1 is mounted on a supporting standard which is designated generally by the reference numeral 10, said standard including an arcuate base 11 for mounting preferably on one of the front fenders of the automobile. To this end, the base 11 is provided with bolt receiving openings 12. The base 11 further includes an upstanding socket 13 into which is threaded the lower end portion of a tubular stem 14. The upper end portion of the stem 14 is threaded into a socket 15 which depends from a head 16 upon which the casing 1 is secured, as by bolts 17. The bolts 17 pass through the openings 8 in the blank 2 from which the casing is formed and through openings provided therefor in the head 16. The head 16 is further provided with an opening 18 which registers with the opening 9 in the blank 2 and which communicates with the tubular stem 14. The base 11 is provided also with an opening communicating with the tubular stem 14 and it will thus be seen that means is provided for carrying conductor wires into the casing 1 from beneath the fender upon which the light is mounted.

A horizontal partition 19 is mounted in the casing 1, said partition having rounded ends projecting beyond the ends of the casing. Thus, upper and lower compartments 20 and 21, respectively, are provided in the casing 1. Brackets 22 are mounted on the partition 19 in the compartments 20 and 21, said brackets having mounted thereon sockets 23 which receive light bulbs 24.

A substantially concavo-convex lens designated generally by the reference numeral 25 is mounted in the forward end portion of the casing 1, said lens including a frosted upper section 26 in front of the compartment 20 and a yellow or amber lower section 27 in front of the lower compartment 21. The adjacent leg 6 and the plate 4 of the blank 2 provide an abutment or shoulder in the casing 1 which assists in maintaining the lens 25 in proper position in said casing. A suitable gasket 28 is interposed between the marginal portions of the lens 25 and the adjacent leg 6. A retaining ring 29 is provided with an inturned flange 30 which is engaged with the lens 25 for securing said lens in the housing, the ring 29 encircling the housing and being secured thereon by screws 31 which are engaged in the openings 7. If desired, a felt or other suitable gasket or cushion may be interposed between the flange 30 of the retaining ring 29 and the lens 25.

The other leg 6 of the blank 2 provides a shoulder or abutment in the rear end portion of the casing 1 with which a mirror or reflector 32 is engaged. Also mounted in the casing 1 rearwardly of the reflector 32 is a concavo-convex rear view mirror 33 which is secured in position by a retaining ring 34 which is similar to the ring 29 and which is secured on the casing 1 in a manner similar to that in which said ring 29 is secured. Gaskets 35 are interposed between the rear view mirror 33 and the reflector 32 in the casing 1. The lower portion of the mirror 33 has mounted therein a red glass bull's-eye 36 which is alined with an opening 37 in the lower portion of the reflector 32. It may be well to here call attention to the fact that the reflector 32 comprises upper and lower sections mounted above and below the horizontal partition 19 in the casing 1.

The lower section 27 of the lens 25 is provided with suitable indicating means, such as a representation of an arrow 38 which, in the illustration, indicates a right turn. Above the arrow 38 is spelled the word "Right", as at 39. The arrow 38 is preferably green and the letters 39 are preferably red.

In use, a light is to be mounted on each front fender of the automobile and, if desired, substantially similar lights may be mounted on each rear fender of said automobile. When lights are mounted on the rear fenders, a single switch will control the left front and rear lights and a single switch will control the right front and rear lights. These switches are preferably mounted on the right and left hand sides of the steering wheel of the automobile. Each switch is to two-way switch for controlling the bulbs in the upper and lower compartments 20 and 21 selectively. When it is desired to make a right turn, the right switch will be closed to illuminate the lights on the right hand fenders of the automobile and, of course, when a left turn is contemplated, the left switch is closed to illuminate the lights on the left hand fenders of the automobile. The bull's-eye 36 which is illuminated by light passing through the opening 37 may be used as a parking light. Further, the bull's-eye 36 provides means through the medium of which the operator of the automobile can ascertain if the bulb in the lower compartment 21 of the light is functioning. The partition 19 is, of course, provided with an opening for the passage of a conductor wire to the bulb 24 in the upper compartment 20.

It is believed that the many advantages of an automobile signal light constructed in accordance with the present invention will be readily understood and although the preferred embodiment of the invention is as illustrated and described, it is to be understood that changes in the details of construction and in the combination and arrangement of parts may be resorted to which will fall within the scope of the invention as claimed.

What is claimed is:

A signal light of the class described comprising a casing open at its ends and formed from a flat sheet rolled to substantially tubular form with its ends in abutting engagement, a plate mounted on the inner side of one end portion of the sheet and projecting therefrom over the other end portion of said sheet and fixed thereto for securing the ends of said sheet together, and a pair of spaced legs integral with the plate and secured to the sheet, the free ends of the legs being spaced from the adjacent end of the sheet and abutting the projecting edge of the plate, the plate and legs being spaced inwardly from the ends of the casing and providing abutments for supporting closures.

ALEXANDER LAWRENCE.